United States Patent
Friend (10) Patent No.: US 11,698,458 B2
(45) Date of Patent: Jul. 11, 2023

(54) METHOD AND SYSTEM FOR PERFORMING DYNAMIC LIDAR SCANNING

(71) Applicant: Caterpillar Inc., Peoria, IL (US)

(72) Inventor: Paul Russell Friend, Morton, IL (US)

(73) Assignee: Caterpillar Inc., Peoria, IL (US)

(*) Notice: Subject to any disclaimer, the term of this patent is extended or adjusted under 35 U.S.C. 154(b) by 573 days.

(21) Appl. No.: 16/781,765

(22) Filed: Feb. 4, 2020

(65) Prior Publication Data

US 2021/0239837 A1 Aug. 5, 2021

(51) Int. Cl.
| | | |
|---|---|---|
| *G01S 17/42* | (2006.01) | |
| *G01S 17/931* | (2020.01) | |
| *G05D 1/02* | (2020.01) | |
| *G01S 7/51* | (2006.01) | |

(52) U.S. Cl.
CPC ............... *G01S 17/42* (2013.01); *G01S 7/51* (2013.01); *G01S 17/931* (2020.01); *G05D 1/024* (2013.01); *G05D 2201/0202* (2013.01)

(58) Field of Classification Search
CPC .......... G01S 17/42; G01S 7/51; G01S 17/931; G01S 17/89; G05D 1/024; G05D 2201/0202; G05D 2201/021
USPC ................. 356/401; 382/173, 212, 213, 283
See application file for complete search history.

(56) References Cited

U.S. PATENT DOCUMENTS

| | | | |
|---|---|---|---|
| 9,905,032 B2* | 2/2018 | Rogan | G06V 10/462 |
| 2016/0245902 A1 | 8/2016 | Watnik et al. | |
| 2017/0371348 A1* | 12/2017 | Mou | G01S 17/87 |
| 2018/0059248 A1* | 3/2018 | O'Keeffe | G01S 17/42 |
| 2018/0209122 A1* | 7/2018 | Kiyota | H04N 7/181 |
| 2019/0154835 A1* | 5/2019 | Maleki | G01S 17/34 |
| 2019/0204423 A1 | 7/2019 | O'Keeffe | |
| 2019/0250273 A1* | 8/2019 | Honkanen | G01S 17/10 |
| 2019/0383926 A1* | 12/2019 | Crouch | G01S 13/428 |
| 2020/0293751 A1* | 9/2020 | Zeng | G01C 21/3807 |
| 2021/0395982 A1* | 12/2021 | Nakazawa | H04N 7/18 |

FOREIGN PATENT DOCUMENTS

DE 102016224076 A1 6/2018

* cited by examiner

*Primary Examiner* — Elaine Gort
*Assistant Examiner* — Ellis B. Ramirez
(74) *Attorney, Agent, or Firm* — Bookoff McAndrews PLLC (57) ABSTRACT

A light detection and ranging (LIDAR) controller is disclosed. The LIDAR controller may determine, based on a position of an implement, a scan area of the LIDAR sensor, wherein the scan area has an increased point density relative to another area of a field of view, of the LIDAR sensor, that includes the implement. The LIDAR controller may cause the LIDAR sensor to capture, with the increased point density, LIDAR data associated with the scan area. The LIDAR controller may process the LIDAR data to determine whether an object of interest is in an environment of the machine that is associated with the scan area. The LIDAR controller may perform an action based on the environment of the machine.

20 Claims, 5 Drawing Sheets

METHOD AND SYSTEM FOR PERFORMING DYNAMIC LIDAR SCANNING

TECHNICAL FIELD

The present disclosure relates generally to configuring a LIDAR sensor and, for example, to configuring of a LIDAR sensor scan area to mask an implement of a machine.

BACKGROUND

Light detection and ranging (LIDAR) can be used in various applications, such as generating high-resolution maps, controlling autonomous vehicles, analyzing objects, and/or the like. For example, a LIDAR sensor, mounted in a fixed or variable positions, can detect, analyze, and/or measure a distance to a target by illuminating the target with pulsed laser light and analyzing reflected pulses. The LIDAR sensor provides LIDAR data that is based on differences in pulse transmission and return times (e.g., time of flight) and/or differences in pulse wavelengths associated with the points of the target. Such LIDAR data can be used to determine representations of the target, features of the target, and/or distances to features of the target.

A LIDAR sensor has a limited set of points for a scan. Accordingly, for a LIDAR sensor that has a fixed field of view (e.g., a LIDAR sensor that is not mounted to an independently controllable mechanical mounting mechanism), obstructions and/or positioning of the LIDAR sensor relative to a target may reduce a level of accuracy associated with detecting and/or analyzing the target, even when the target is within the field of view of the LIDAR sensor.

A machine, such as loader, excavator, dozer, and/or the like, used in certain industries (e.g., mining, construction, farming, transportation, or the like) may be relatively large and/or include a plurality of blind spots within which an operator may not be able to detect objects or personnel. Accordingly, the machine can include a LIDAR sensor to detect (and/or assist the operator with detecting) objects, personnel, or other characteristics of an environment (e.g., such as a worksite of the machine) for collision avoidance, for personnel safety, for autonomous (or semi-autonomous) control of the machine, and/or the like.

Further, the machine can include an implement (or work tool) configured to perform an operation. The implement, when in a certain position for a particular operation, can block a field of view of the LIDAR sensor or any other similar sensor (e.g., a radio detection and ranging (RADAR) sensor, an imaging sensor, a camera, and/or the like). As a more specific example, a loader (e.g., a wheel loader) may include a bucket to penetrate, dig, displace, hold, and/or transport material, such as ground material (e.g., rock, soil, and/or the like) at a worksite. In such a case, during a dig or scoop operation, the bucket can be lowered to the ground to acquire the ground material, and during a material transport operation and/or travel operation, the bucket can be lifted to prevent the bucket from engaging with the ground (e.g., to reduce drag during transport, to enable increased speed of transport, and/or the like). Accordingly, during certain operations, portions of a field of view of an operator and/or sensor can be blocked by an implement.

An apparatus for illuminating or masking an object is disclosed in United States Patent Publication No. 2016/0245902, which published on Aug. 25, 2016 ("the '902 reference"). The apparatus in the '902 reference includes a spatial light modulator and a LIDAR detector to detect range, position, and/or time data for an object of interest or an object of disinterest.

While the apparatus of the '902 reference uses the spatial light modulator to illuminate an object of interest or mask an object of disinterest, depending on a user's application, the detected data of the LIDAR detector is used to identify the object of interest or the object of disinterest.

The LIDAR controller of the present disclosure solves one or more of the problems set forth above and/or other problems in the art.

SUMMARY

According to some implementations, a method may include receiving implement information associated with an implement of a machine; determining, based on the implement information, a position of the implement relative to a field of view of a light detection and ranging (LIDAR) sensor; determining, based on the position of the implement, a scan area within the field of view, wherein the scan area has an increased point density relative to another area of the field of view that includes the implement; causing the LIDAR sensor to capture, with the increased point density, LIDAR data associated with the scan area; processing the LIDAR data to determine, using an object detection model, a characteristic of an environment associated with the scan area; and performing an action associated with the characteristic.

According to some implementations, a device may include one or more memories; and one or more processors, communicatively coupled to the one or more memories, configured to: determine a position of an implement of a machine; determine, based on the position of the implement, a scan area within a field of view of a LIDAR sensor mounted to the machine, wherein the scan area has an increased point density relative to another area of the field of view that includes the implement; cause the LIDAR sensor to capture, with the increased point density, LIDAR data associated with the scan area; process the LIDAR data to determine whether an object of interest is within the scan area; and perform an action associated with whether the object of interest is within the scan area.

According to some implementations, a system may include a LIDAR sensor and a controller to: determine, based on implement information associated with an implement of a machine, a position of the implement; determine, based on the position of the implement, a scan area of the LIDAR sensor, wherein the scan area has an increased point density relative to another area of a field of view, of the LIDAR sensor, that includes the implement; cause the LIDAR sensor to capture, with the increased point density, LIDAR data associated with the scan area; process the LIDAR data to determine whether an object of interest is in an environment of the machine that is associated with the scan area; and perform an action based on the environment of the machine.

DETAILED DESCRIPTION

This disclosure relates to a light detection and ranging (LIDAR) controller for a LIDAR sensor associated with and/or mounted to a machine. The LIDAR controller has universal applicability to any machine utilizing a LIDAR sensor to monitor the machine and/or an operation of the machine. The term "machine" may refer to any machine that performs an operation associated with an industry such as, for example, mining, construction, farming, transportation, or any other industry. As some examples, the machine may be a wheel loader, an excavator, a backhoe loader, a dozer, a cold planer, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a vehicle, a tractor scraper, or other above ground equipment, underground equipment, or marine equipment.

Figure 1:
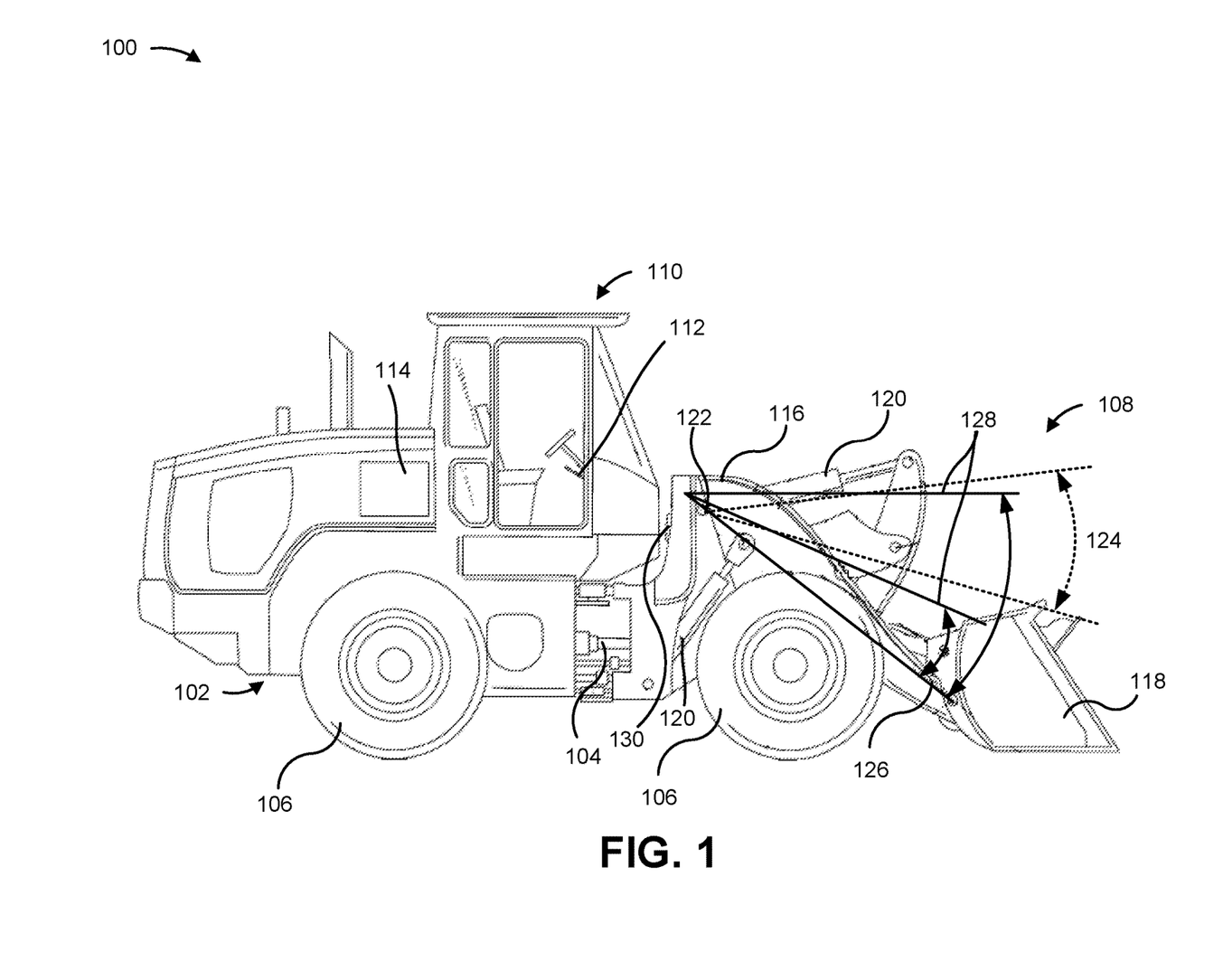
FIG. 1 is diagram of an example machine described herein.

FIG. 1 is diagram of an example machine 100 described herein. The machine 100 is shown in FIG. 1 as a wheel loader but may include any type of machine that may utilize a LIDAR sensor and/or LIDAR controller as described herein. Accordingly, in the following example, the machine 100, as described herein, may include and/or utilize an implement, that can be controlled or adjusted to be in various positions, to perform an operation at a worksite.

As shown, the machine 100 includes a support structure 102, a drive system 104, ground engaging elements 106 (shown as wheels), and an implement 108. Further, the machine 100 in FIG. 1 includes an operator station 110 including an operator interface 112 that can be used to operate the machine 100. For example, the operator interface 112 may include one or more input devices (e.g., buttons, keypads, touchscreens, trackballs, joy sticks, levers, pedals, steering mechanisms, and/or the like) and/or output devices (e.g., displays, illumination indicators, speakers, and/or the like) to control, monitor, and/or interact with the machine 100 and/or the implement 108. In some implementations, the operator station 110 and/or one or more components of the operator interface 112 may be remotely located (e.g., not onboard the machine 100). In such a case, the machine 100 may be remotely controlled, may remotely receive communications to perform operations (e.g., in association with autonomous control of the machine 100), and/or the like.

The machine 100 includes an electronic control module (ECM) 114 configured to control various operations of the machine 100. The ECM 114 may control the operations according to inputs from operator interface 112. In some implementations, the ECM 114 may be configured to autonomously control an operation of the machine. For example, the ECM 114 may process instructions associated with controlling various components of the machine 100 to perform an operation, as described herein.

The machine 100 also has a power source (e.g., an internal combustion engine, a generator, a battery, and/or the like) configured to supply power to the machine 100 and/or components of machine 100. The power source may be operably arranged to receive control signals from the operator interface 112 in the operator station 110. Additionally, the power source may be operably arranged with the drive system 104, the implement 108, and/or one or more rotational members (e.g., clutches, gears, and/or the like) to selectively operate the drive system 104, to selectively operate the implement 108, and/or other systems of the machine 100. The power source may provide operating power for the propulsion of the drive system 104, the operation of the implement 108, and/or the other systems of the machine 100.

The drive system 104 may be operably arranged with the power source to selectively propel the machine 100 via control signals from the operator interface 112. The drive system 104 may be operably connected to the ground engaging elements 106 through axles, drive shafts, a transmission, and/or other components. The ground engaging elements 106 may be provided in the form of a wheel-drive system, a track-drive system, and/or any other type of drive system configured to propel the machine 100 forward and/or backward. The drive system 104 may be operably arranged with the power source to selectively operate the implement 108, which may be movably connected to the machine 100 and the drive system 104.

The implement 108 may be operably arranged with the drive system 104 such that the implement 108 is movable through control signals transmitted from the operator interface 112 to the drive system 104. The implement 108 illustrated in FIG. 1 includes one or more lift arms 116 mechanically coupled with a bucket 118. A hydraulics system 120 of the implement 108 may be powered by the power source and controlled by the operator interface 112 to adjust a position of the lift arms 116 and/or the bucket 118. The bucket 118 may pivot about an end of the lift arms between an open position and a closed position (e.g., to facilitate a digging operation, a holding operation, a dumping operation, and/or the like). Other implementations can include any other suitable implement for various tasks, such as, for example, dozing, blading, brushing, compacting, grading, lifting, ripping, plowing, and/or the like. Example implements include dozer blades, augers, buckets, breakers/hammers, brushes, compactors, cutters, forked lifting devices, grader bits and end bits, grapples, and/or the like.

According to some implementations described herein, the machine 100 includes a LIDAR sensor 122 for monitoring one or more operations of the machine 100. As shown in FIG. 1, the LIDAR sensor 122 is mounted to the support structure 102 to have a field of view 124 (shown within dotted lines) that is directed over or toward the implement 108. In other implementations, the LIDAR sensor 122 may be mounted on the lift arms 116 and/or on the operator station 110 so that the LIDAR sensor 122 includes a different field of view that is directed toward the implement 108.

The LIDAR sensor 122 is mounted to the machine 100 such that a field of view of the LIDAR sensor 122 depends on the orientation and/or position of the machine 100. Further, the LIDAR sensor 122 may be mounted to the machine 100 such that a portion of the implement 108 that is within the field of view 124, if any, depends on the orientation and/or position of the implement 108. For example, in a lowered position 126 (e.g., for a dig operation) as shown in FIG. 1, the bucket 118 is not positioned within the field of view 124. Accordingly, the LIDAR sensor 122 can capture LIDAR data associated with any objects of interest in the field of view 124 that are beyond the bucket 118. In such a case, the LIDAR sensor 122 may determine a characteristic of an environment of the machine 100, such as by detecting obstructions, personnel, a route (or waypoints of a route), and/or the like (e.g., according to an object detection model and/or object recognition model, as described herein). In contrast, in a partially or fully lifted position 128 (e.g., for a transport operation and/or dump operation), the bucket 118 may be positioned within the field of view 124. Accordingly, a portion of the field of view 124 of the LIDAR sensor 122 is blocked, thereby preventing the LIDAR sensor from being able to capture LIDAR data associated with an environment of the machine 100 that is beyond the bucket 118. In this way, the field of view 124 of the LIDAR sensor 122 may depend on a position and/or orientation of the machine 100 and whether the implement 108 (e.g., the lift arms 116 and/or bucket 118) is within the field of view 124 may depend on a position and/or orientation of the implement 108 (e.g., the position and/or orientation of the lift arms 116 and/or the bucket 118).

The machine 100 may include an operation sensor system 130 that includes one or more sensors to monitor operations of the machine 100. Such sensors may include a position sensor (e.g., a magnetometer, such as a Hall effect sensor, an anisotropic magnetoresistive (AMR) sensor, a giant magneto-resistive sensor (GMR), and/or the like), a location sensor (e.g., a global navigation satellite system (GNSS), including a global positioning system (GPS) receiver, a local positioning system (LPS) device (e.g., that uses triangulation, multi-lateration, etc.), and/or the like), an inertial sensor (e.g., an accelerometer and/or a gyroscope, such as an inertial micro-electro-mechanical systems (MEMS) device, a fiber optic gyroscope (FOG), or a similar type of device), a ranging radio, a perception based localization sensor (e.g., that uses radio detection and ranging (RADAR), LIDAR, a stereo camera, a mono camera, and/or the like), a speed sensor, a motion sensor, an infrared sensor, a temperature sensor, a pressure sensor, and/or the like.

The operation sensor system 130 may include physical sensors and/or any appropriate type of measurement system that generates measurements for values of operating parameters of the machine 100 based on a computational model and/or one or more measured values. The operation sensor system 130 may provide measurements associated with various operating parameters used by the ECM 114 to identify, monitor, and/or control operations of the machine 100.

The operation sensor system 130 may be configured to coincide with the ECM 114, may be configured as a separate control system, and/or may be configured as a part of other control systems. Further, the ECM 114 may implement the operation sensor system 130 by using computer software, hardware, or a combination of software and hardware. For example, the ECM 114 may execute instructions to cause sensors of the operation sensor system 130 to sense and/or generate operating values for parameters of the machine 100.

The LIDAR sensor 122 may enable the ECM 114 (and/or an operator, via operator interface 112) to monitor an operation of the machine 100 by providing LIDAR data associated with objects within the field of view 124. For example, the ECM 114, based on a position of the implement 108 (which may be determined from inputs of the operator interface 112 or measurements of the operation sensor system 130), may be configured to determine a scan area that does not include the implement 108 (or a mask area associated with portions of the field of view 124 that include the implement 108), cause the LIDAR sensor 122 to capture LIDAR data from the scan area with an increased point density of the LIDAR sensor 122 relative to other portions of the field of view 124, such as portions that include the implement 108 (e.g., to improve an accuracy of detecting and/or analyzing the object), and analyze objects depicted by and/or associated with the LIDAR data.

Accordingly, with relatively increased accuracy over previous techniques, the ECM 114 may be able to determine a characteristic of a navigable environment of the machine 100 (e.g., whether a route (or path) includes an obstruction, whether a route includes personnel or an individual, whether the navigable environment includes a designated route, and/or the like), a characteristic of a worksite of the machine 100 (e.g., an amount of ground material at a dig site, an amount of ground material at a dump location of the worksite, an amount of available space for ground material at the dump location, and/or the like). The ECM 114 may provide information identifying the characteristic to the operator interface 112 and/or to a remotely located device (e.g., a backend monitoring system communicatively coupled with the machine 100 and/or ECM 114).

As indicated above, FIG. 1 is provided as an example. Other examples may differ from what is described in connection with FIG. 1.

Figure 2:
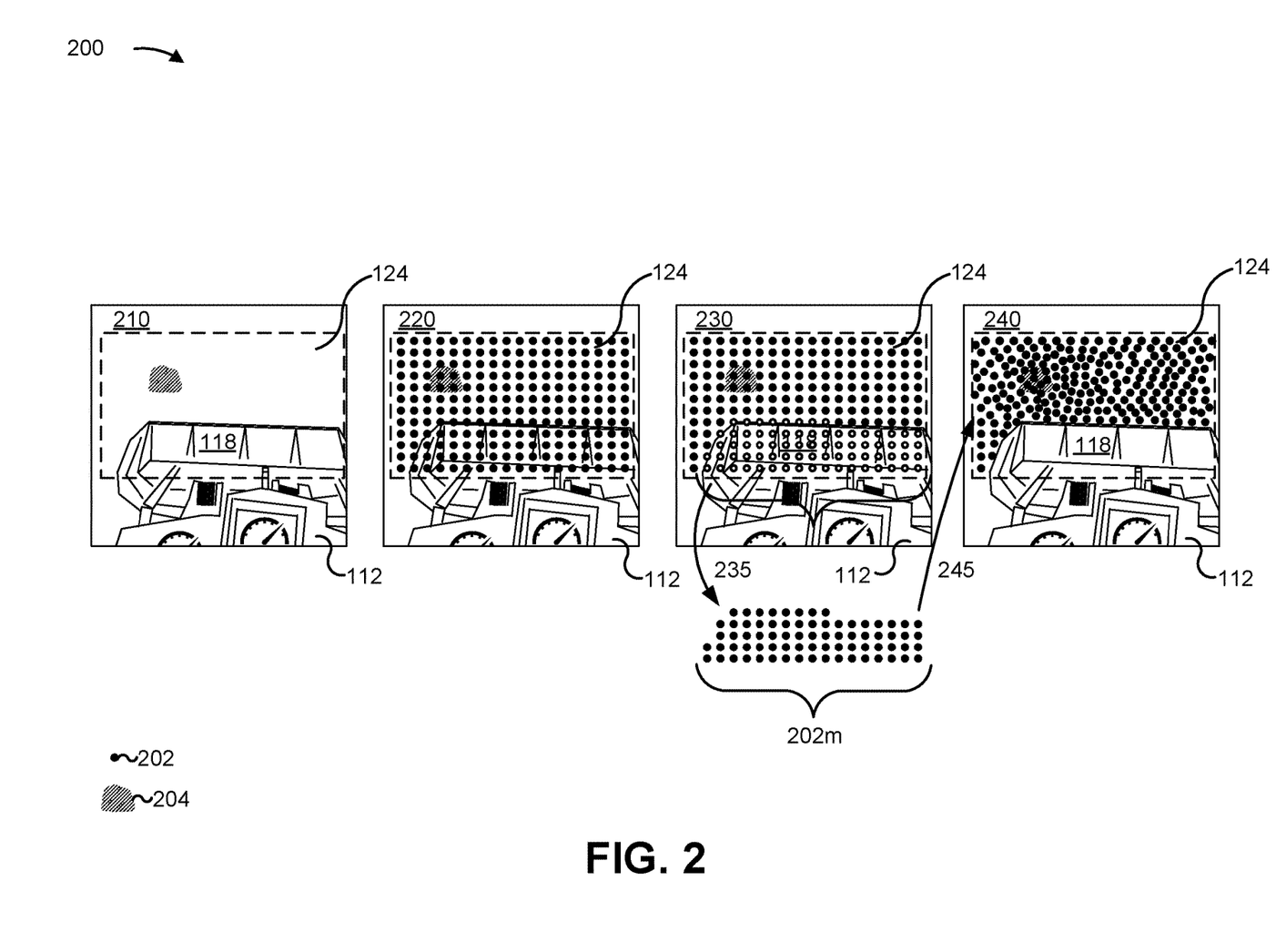
FIGS. 2 and 3 are diagrams of one or more example implementations described herein.

FIG. 2 is a diagram of an example implementation 200 described herein. Example implementation 200 illustrates an example of an ECM 114 configuring a scan area of the LIDAR sensor 122 to have an increased point density based on a particular position of the implement 108. The increased point density, as shown in FIG. 2, is achieved by focusing or distributing LIDAR points 202 within an area of the field of view 124 that is smaller than a total area of the field of view 124. The LIDAR points 202 may correspond to a maximum amount of illumination points within the field of view 124 during a scan of the LIDAR sensor 122. The increased point density is relative to other portions of the field of view 124 of LIDAR sensor 122, such as areas of the field of view 124 that include the implement 108, as described herein.

The ECM 114, according to example implementation 200, configures the scan area of the LIDAR sensor 122 to analyze a navigable environment of the machine 100 that is beyond the bucket 118. In example implementation 200, an achieved increased point density in the configured scan area improves an accuracy with respect to detecting an obstruction 204. As shown in frames 210, 220, 230, and 240 of FIG. 2, the implement 108 and the obstruction 204 are within the field of view 124 of the LIDAR sensor 122.

In frame 220, the LIDAR points 202 are shown as being equally distributed throughout the field of view 124 in a 12×18 array Accordingly, the total quantity of the LIDAR points 202 is 216. The scan using the LIDAR points 202 in frame 220 may be performed (e.g., according to a default point mapping, a point mapping to analyze an environment when the field of view 124 does not include the implement 108, a point mapping to analyze an environment without masking the implement 108, and/or the like). The ECM 114 may control the LIDAR sensor 122 to focus each of the LIDAR points 202 anywhere within field of view 124. However, the equal distribution of the LIDAR points 202 provides a minimum point density (e.g., a lowest quantity of points per a given area of the field of view 124) of the LIDAR points 202 throughout the field of view 124 at the particular range or zoom setting illustrated in FIG. 2. The minimum point density results from the 216 LIDAR points 202 being a fixed quantity or maximum quantity of LIDAR points for a scan of the LIDAR sensor 122. In other words, additional LIDAR points cannot be added to the scan without adding another LIDAR sensor, which can add cost and/or processing complexity.

When processing the field of view 124 according to the point mapping of frame 220, the ECM 114, if the ECM 114 is configured to identify the obstruction 204, would waste processing resources associated with receiving, analyzing, and/or generating information associated with the LIDAR points that are focused on the implement 108 (e.g., the lift arms, the bucket 118, and/or the like). Such processing resources would be wasted because the LIDAR data from the LIDAR points 202 over the implement 108 in frame 220 do not provide information associated with a desired area of the machine (e.g., the environment beyond the implement 108). According to some implementations, information associated with the implement 108 from the LIDAR points 202 may be stored (e.g., during a first LIDAR scan) based on determining that the implement 108 is within the field of view, and stored to enable the LIDAR points associated with the implement 108 to be refocused in the desired area in a subsequent scan.

As shown in frame 230, the ECM 114 may identify the LIDAR points 202m that illuminate the bucket 118. The ECM 114 may mask the bucket 118 (and/or the implement 108) by removing, as shown by reference number 235, the LIDAR points 202m from locations within the field of view that illuminate portions of the bucket 118. In frame 230, similar to frame 220, the LIDAR points 202, other than the LIDAR points 202m, are shown with a minimum point density throughout the remaining field of view (e.g., an area of the field of view 124 that does not include the bucket 118 (or other components of the implement 108) of the LIDAR sensor 122 (due to the equal distribution of the LIDAR points 202). In this way, because the bucket 118 is positioned within the field of view 124 of the LIDAR sensor 122, the ECM 114 may disregard LIDAR points 202m, thereby conserving resources (e.g., computing resources and/or power resources) associated with the LIDAR sensor 122 capturing LIDAR data that is representative of the bucket 118 (and/or the implement 108), thereby improving processing speeds associated with a LIDAR scan (e.g., because less sensor data is obtained and/or processed).

As described herein, the ECM 114 may determine, from an input (or a setting) received from the operator interface 112 and/or a measurement from the operation sensor system 130 that the bucket 118 is positioned within the field of view 124. The input from the operator interface 112 and/or measurement from the operation sensor system 130 may be associated with (e.g., reflect) the position of the implement 108, a speed of the machine 100, and/or the like. As described herein, the ECM 114 may identify the LIDAR points 202m based on a scan area mapping that identifies sub portion of a scan area within the field of view 124 indicating the location of the implement 108. The sub portion may be indicated via coordinates of the field of view 124 and/or may be determined and/or mapped according to information associated with the implement 108 (e.g., implement information from the operator interface 112, information from the operation sensor system 130, and/or the like). Further, the coordinates may be representative of and/or associated with a perimeter of the scan area, coordinates for the LIDAR points 202 other than the LIDAR points 202m that are to be masked based on the position of the implement 108, and/or the like.

The field of view 124 may correspond to a total scan area 124. Accordingly, a sub-area of interest may correspond to an area of the field of view 124 that includes obstruction 204 and/or the environment beyond the bucket 118, and a masked sub-area (e.g., a sub-area that is not of interest) may correspond to an area of the field of view 124 that includes the bucket 118. Accordingly, the total scan area (or field of view 124) may correspond to a sum of a sub-area of interest and a masked-sub area.

To increase a point density of the scan area, the ECM 114 may redistribute the LIDAR points 202m into the determined scan area as shown in frame 240. For example, the ECM 114 can increase the point density, as shown by reference number 245, by refocusing the LIDAR points 202m from the mask area to the area of interest. As described herein, increasing the point density improves a degree of accuracy associated with detecting and/or analyzing an environment of the scan area (e.g., the navigable environment beyond the bucket 118). Accordingly, the ECM 114 causes the LIDAR sensor 122 to capture LIDAR data, via a LIDAR scan, using the scan area point mapping (and/or a mask area point mapping) so as to configure the scan area of the LIDAR scan to increase the point density on any objects of interest that may be in the navigable environment of the machine (e.g., to increase a quantity of illuminating points on surfaces of the obstruction 204).

To detect the obstruction 204, the ECM 114 may compare the captured increased point density LIDAR data to corresponding reference LIDAR data for an open environment (e.g., an environment that does not include an obstruction corresponding to the obstruction 204). Accordingly, due to the reference LIDAR data being different from the captured LIDAR data from frame 240, the ECM 114 may detect the obstruction 204. Further, as shown relative to a comparison of frame 230 with frame 240, the increased point density of frame 240 enables an increased quantity of LIDAR points 202 (because of the availability of the LIDAR points 202m) to illuminate and/or reflect from the surface of the obstruction 204, thus enabling the LIDAR sensor 122 to capture LIDAR data that enables the ECM 114 to more accurately detect the obstruction 204.

The increased point density may enable the ECM 114, via an object recognition model, to more accurately analyze the obstruction 204 to identify a characteristic of the obstruction 204, such as a type of the obstruction 204, a specific location of the obstruction 204 (relative to a location of the machine 100 and/or the LIDAR sensor 122, and/or the like). More specifically, in example implementation 200, the ECM 114 may determine and/or indicate, via the operator interface 112, that the obstruction 204 is a boulder in the navigable environment. In other examples, the ECM 114 may identify other types of objects, such as personnel (or individuals), waypoints (e.g., signs or route markings), other machines, buildings, walls, and/or the like.

Accordingly, the ECM 114 may configure the scan area of the LIDAR sensor 122 to mask the implement 108 (e.g., disregard LIDAR data associated with the LIDAR points 202m) and/or include an increased point density in an area of the field of view 124 that includes the navigable environment of the machine 100 to increase processing speeds and/or accuracy associated with the LIDAR data of a scan of the LIDAR sensor 122. As indicated above, FIG. 2 is provided as an example. Other examples may differ from what is described in connection with FIG. 2.

Figure 3:
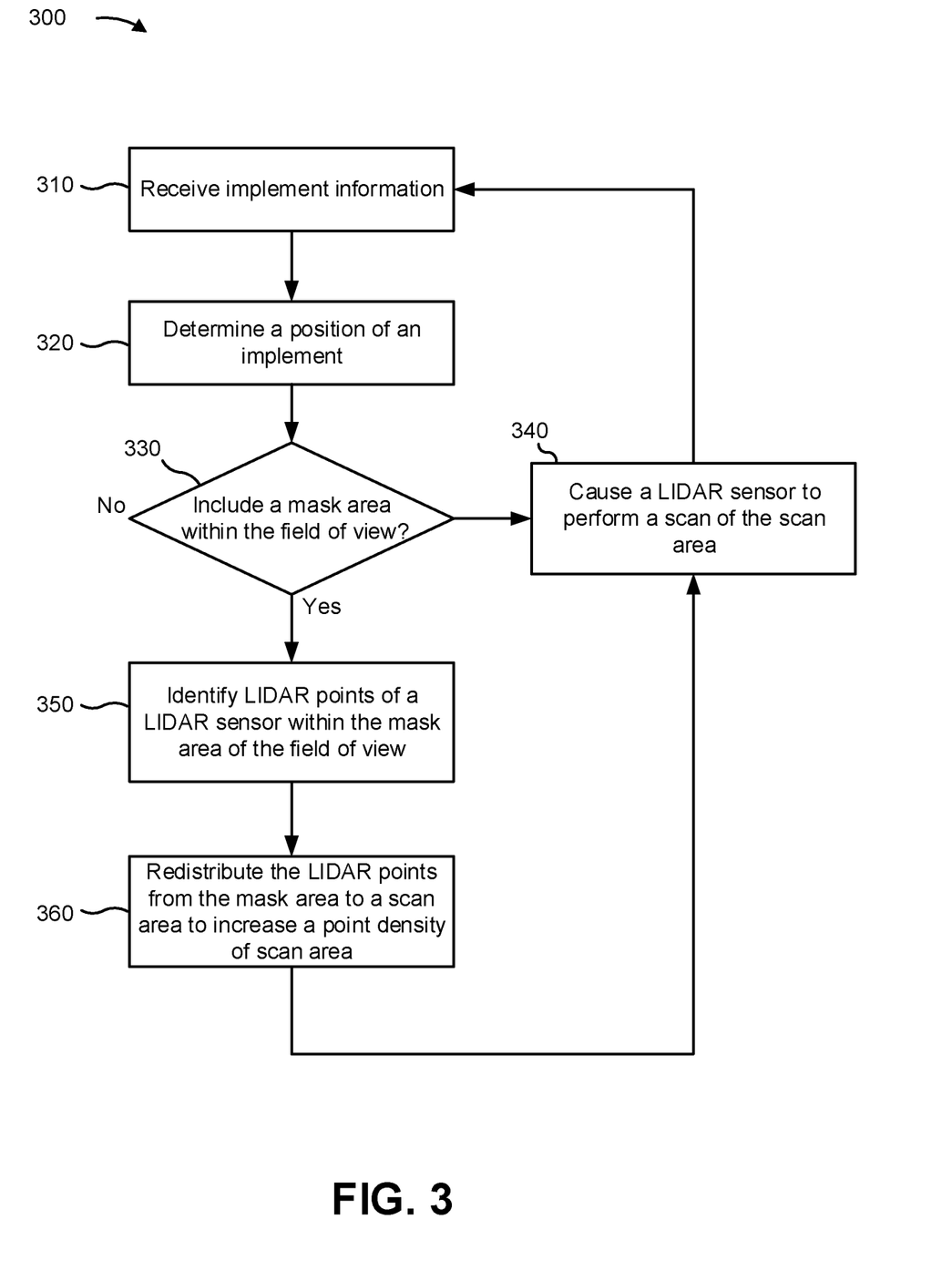

FIG. 3 is a diagram of an example implementation described herein. The example implementation of FIG. 3 includes an iterative process 300 that may be performed by the ECM 114 to control the LIDAR sensor 122, as described herein. At block 310, the ECM 114 receives implement information. For example, the ECM 114 may monitor one or more received inputs from the operator interface 112 and/or received measurements from the operation sensor system 130 associated with one or more operating parameters of the machine 100. The received implement information may be received based on a change to the position of the implement 108. Additionally, or alternatively, the implement information may be received based on the ECM 114 periodically obtaining the implement information from the operator interface 112 and/or the operation sensor system 130 (e.g., by prompting the operator interface 112 to indicate a setting associated with a position of the implement 108, by prompting a position sensor of the operation sensor system 130 to measure and indicate the position of the implement 108, and/or the like).

When the ECM 114 receives the implement information, at block 320, the ECM 114 determines the implement position by processing the implement information. For example, the ECM 114 may parse the implement information to identify the position of the implement 108 (e.g., according to a position mapping that maps positions of the implement 108 to corresponding received implement information).

After determining the position of the implement 108, at block 330, the ECM 114 determines whether to include a mask area within the field of view 124. For example, the ECM 114 may determine whether the implement 108 is within the field of view 124 to determine whether LIDAR data associated with the implement 108 is to be masked (or disregarded).

As described herein, the ECM 114 may determine whether to mask the implement 108 according to a scan area mapping that maps a plurality of positions of the implement to scan areas of the LIDAR sensor 122 that facilitate masking the implement 108. If a mask area is not to be included within the field of view 124 for a LIDAR scan, the ECM 114, at block 340, may cause the LIDAR sensor 122 to perform a scan of a scan area of the field of view 124 without masking the implement 108. For example, if the field of view 124 is not to include a mask area, the LIDAR sensor 122 may perform a LIDAR scan using a default setting. As indicated by the process 300, the ECM 114 may iteratively receive the implement information after causing the LIDAR sensor 122 to perform the scan to determine the presence and position of the implement 108 and/or cause the LIDAR sensor 122 to perform a subsequent scan, as described herein.

In the example of FIG. 3, when the ECM 114 determines that the field of view 124 is to include a mask area (e.g., and/or that the implement 108 is to be masked within the field of view 124), at block 350 the ECM 114 identifies the LIDAR points 202m that are within a mask area of the field of view 124. As described herein, the mask area may correspond to one or more areas of the field of view 124 that include the implement 108. The ECM 114 may identify coordinates of the mask area and/or coordinates of LIDAR points 202m that are within the mask area using the scan area mapping and the determined position of the implement 108.

At block 360, the ECM 114 redistributes the LIDAR points 202m from the mask area to the scan area to increase the point density of the scan area. For example, the ECM 114 may determine coordinates of the scan area for the LIDAR points 202m. The coordinates for the LIDAR points 202, including the LIDAR points 202m, may be randomly distributed within the scan area of the field of view 124 to mask the implement 108. Additionally, or alternatively, the coordinates for the total quantity of LIDAR points 202, including the LIDAR points 202m, may be determined so as to equally distribute the LIDAR points 202 throughout the scan area (e.g., such that the LIDAR points are equidistant from one another). The distribution of the LIDAR points 202 for a scan area may be determined using the scan area mapping. For example, the scan area mapping may identify the coordinates for a total quantity of LIDAR points 202 according to the position of the implement 108 to mask the implement 108 (using a mask area of the field of view 124 that includes the implement 108) and/or to increase the point density of the scan area of the field of view 124 (e.g., the area of the field of view that includes or depicts an environment of the machine 100).

After redistributing the LIDAR points 202, at block 340, the ECM 114 causes the LIDAR sensor 122 to perform a scan of the scan area. In such a case, because the field of view 124 includes a mask area, the scan is to mask the implement 108. Furthermore, such a scan may have an increased point density relative to the field of view 124 not including a mask area, as described above. Accordingly, the LIDAR sensor 122 may provide LIDAR data that is only associated with a scan area to permit the ECM 114 to analyze LIDAR data that enables improved accuracy (e.g., due to the increased point density) of detecting and/or analyzing objects of interest within the environment of the machine 100.

The ECM 114, at block 340, may cause the LIDAR sensor 122 to iteratively perform a scan with a particular refresh rate. For example, the ECM 114 may determine a refresh rate for the scan based on the position of the implement 108. More specifically, the ECM 114 may cause the LIDAR sensor 122 to iteratively scan the navigable environment of the machine 100 at a relatively slow refresh rate when the implement 108 is positioned within the field of view 124. In such a case, the ECM 114 may conserve resources associated with performing unnecessary scans using an increased refresh rate because the increased point density provides LIDAR sensor data that improves an accuracy of detecting and/or analyzing objects in the scan area. On the other hand, the ECM 114 may cause the LIDAR sensor 122 to iteratively scan the navigable environment of the machine at a relatively fast refresh rate when the implement is not positioned within the field of view 124. In such a case, the ECM 114 may improve an accuracy of detecting and/or analyzing the objects in the scan area relative to a slower refresh rate by increasing the amount of LIDAR sensor data that can be used to detect and/or analyze the objects (e.g., because the scan area may include a minimum point density or relatively low point density).

As indicated above, FIG. 3 is provided as an example. Other examples may differ from what is described in connection with FIG. 3.

Figure 4:
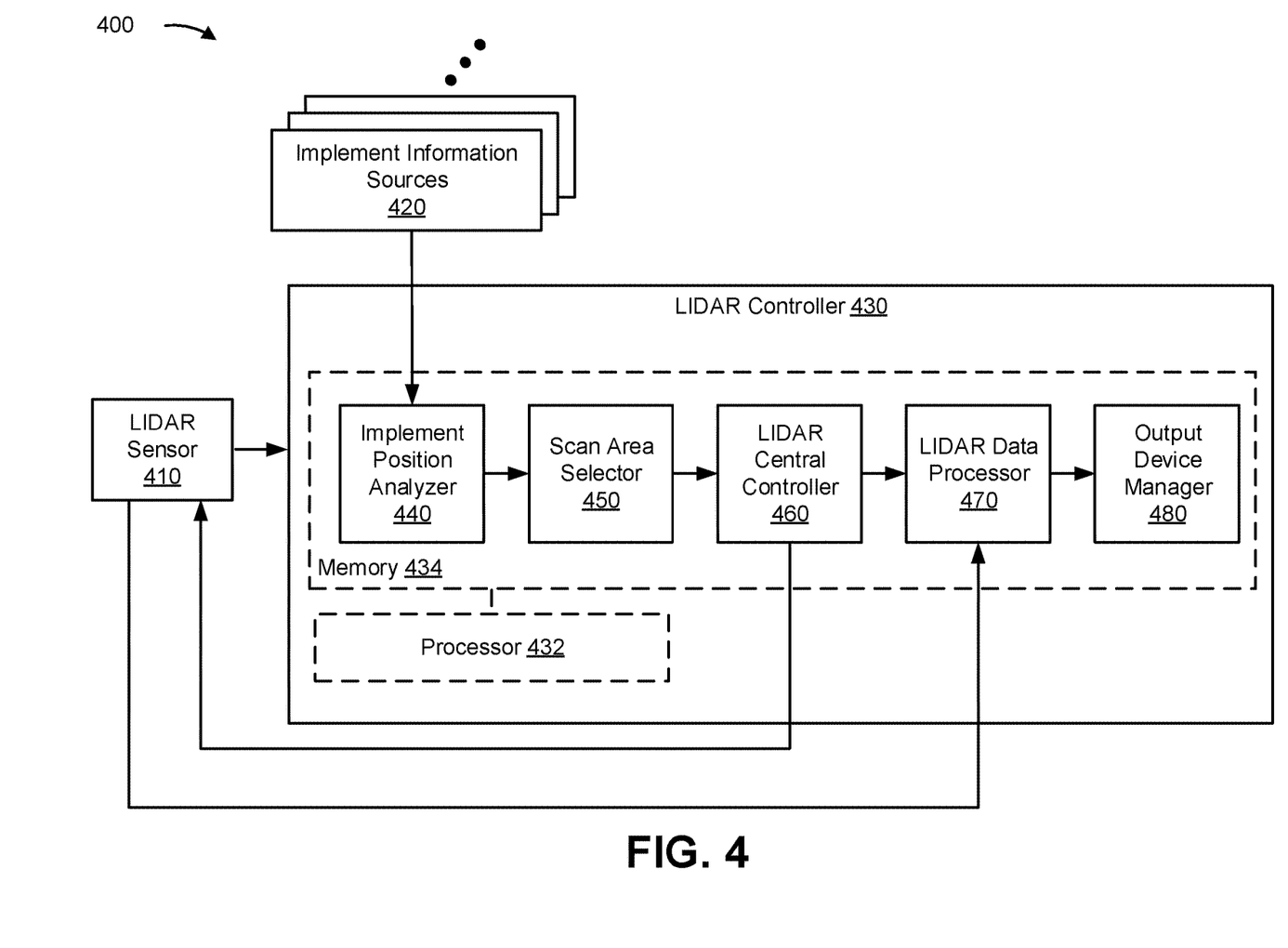
FIG. 4 is a diagram of an example system, described herein, that may be implemented in association with the machine of FIG. 1.

FIG. 4 is a diagram of an example system 400, described herein, that may be implemented in association with the machine 100 of FIG. 1. The system 400 of FIG. 4 includes a LIDAR sensor 410 (e.g., corresponding to the LIDAR sensor 122 of FIG. 1), one or more implement information sources 420 (referred to herein individually as "implement information source 420", and collectively as "implement information sources 420"), and a LIDAR controller 430 that includes a processor 432 and memory 434. As shown, the LIDAR controller 430 includes an implement position analyzer 440, a scan area selector 450, a LIDAR central controller 460, a LIDAR data processor 470, and an output device manager 480.

The LIDAR sensor 410 may include one or more devices, components, and/or elements that are capable of receiving, generating, storing, processing, and/or providing information associated with LIDAR, as described herein. For example, LIDAR sensor 410 may include a light emitter to emit light toward illumination points (which may be referred to herein as LIDAR points) within a field of view of the LIDAR sensor 410, an array of sensing elements to sense reflected light from the illumination points, and a signal processor to generate LIDAR data associated with the emitted light and sensed reflected light. The LIDAR data may be representative of an image of the field of view, a shape of an object detected within the field of view, and/or the like.

The LIDAR sensor 410 may be a fixed LIDAR sensor that is mounted to the machine 100 (and/or the implement 108) in a fixed position (e.g., such that movement of the machine 100 corresponds to movement of the LIDAR sensor 410). The LIDAR sensor 410 may be mounted to the machine 100 so that, based on a position of the implement 108, a portion of the implement 108 (e.g., the lift arms 116, the bucket 118, or a portion of the bucket 118) of the machine 100 can be within the field of view of the LIDAR sensor 410. A resolution of the LIDAR sensor 410 may be based on a maximum quantity of illumination points (which may be referred to interchangeably herein as LIDAR points) of each scan. Further, as described herein, the LIDAR sensor 410 may be configured to adjust a point density within a scan area of the field of view based on instructions from the LIDAR controller 430.

The implement information sources 420 include one or more devices, components, and/or elements that are capable of generating, storing, processing, and/or providing information associated with an operating parameter and/or operating condition of the implement 108 and/or the machine 100. For example, the implement information sources 420 may include one or more input components of the operator interface 112, one or more sensors of the operation sensor system 130, and/or the like. Accordingly, the implement information sources 420 may provide information associated with a position of the implement 108 and/or the machine 100, such as information identifying a control setting associated with the implement 108, a position of the lift arms 116 and/or the bucket 118, a speed of the machine 100, a route of the machine 100 (e.g., based on a navigation input and/or navigation system), and/or the like.

The LIDAR controller 430 may be associated with, included within, and/or correspond to the ECM 114 of FIG. 1. Processor 432 is implemented in hardware, firmware, and/or a combination of hardware and software. Processor 432 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 432 includes one or more processors capable of being programmed to perform a function. Memory 434 includes a random-access memory (RAM), a read only memory (ROM), and/or another type of dynamic or static storage device (e.g., a flash memory, a magnetic memory, and/or an optical memory) that stores information and/or instructions for use by processor 432 (e.g., information and/or instructions associated with the implement position analyzer 440, the scan area selection module 450, the LIDAR central controller 460, the LIDAR data processor 470, the output device manager 480, and/or the like).

The implement position analyzer 440 includes one or more components or devices configured to analyze implement information associated with the implement 108. For example, the implement position analyzer 440 may receive the implement information from the implement information sources 420 and determine the position of the implement 108 based on the implement information. The implement information may include inputs from operator interface 112, including a control input to adjust a position of the implement 108, a control input to adjust an orientation of the machine 100 (e.g., a steering input to adjust a direction of travel of the machine), or a control input to move the machine 100.

The scan area selection module 450 includes one or more components or devices configured to determine or select a scan area within a field of view of the LIDAR sensor 410. The scan area may have an increased point density relative to another area of the field of view and/or a minimum point density corresponding to a maximum quantity of illuminating points being equally distributed throughout the field of view of the LIDAR sensor 410.

The scan area selection module 450 may select and/or configure the scan area based on the determined position of the implement. For example, the scan area selection module 450 may select, from a plurality of point mappings for corresponding positions of the implement 108, a point mapping for a scan area for a position to enable an object of interest within the scan area (e.g., the obstruction 204 and/or the like) to be detected and/or analyzed with the increased point density. The plurality of point mappings may be stored in a data structure of the scan area selection module 450 (e.g., within memory 434).

The scan area selection module 450 may determine the scan area based on determining the position of the implement relative to a field of view of the LIDAR sensor 410 and a perimeter of a mask area associated with portions of the implement 108 that are within the field of view. The scan area may correspond to an area of the field of view that does not include the mask area. The scan area selection module may distribute a total quantity of LIDAR points of the LIDAR sensor throughout the scan rea to provide the increased point density (thereby, not including any LIDAR points within the mask area). Additionally, or alternatively, the scan area selection module 450 may determine a perimeter of a mask area associated with portions of the implement 108 that are within the field of view of the LIDAR sensor 410. In such a case, the scan area selection module 450 may redistribute LIDAR points of the LIDAR sensor 410 from the mask area to the scan area to provide the increased point density.

The LIDAR central controller 460 includes one or more components or devices configured to cause the LIDAR sensor 410 to capture LIDAR data associated with the scan area. For example, the LIDAR central controller 460, via one or more instructions or commands, may provide the point mapping in order to cause the LIDAR sensor 410 to capture the LIDAR data according to the point mapping. Accordingly, the LIDAR central controller 460 may cause the LIDAR sensor 410 to capture a relatively increased quantity of LIDAR data associated with an object of interest to be captured due to the increased point density of the scan area.

The LIDAR data processor 470 includes one or more components or devices configured to process the LIDAR data to detect and/or analyze an object of interest in the scan area of the LIDAR sensor 410. The object of interest may correspond to a characteristic of an environment of the machine 100 and/or a worksite of the machine 100. For example, the object of interest may include an obstruction in a navigable environment of the machine 100, navigation or route information associated with a route of the machine 100, personnel at a worksite of the machine 100, status information associated with an operation of the machine 100 and/or the worksite of the machine, and/or the like.

The LIDAR data processor 470 may use a LIDAR analysis model (e.g., an object detection model, an object recognition model, an object analysis model, a spatial analysis model, and/or the like) to determine the status of the operation. The LIDAR analysis model may be associated with a navigation system of the machine 100. In such a case, the LIDAR analysis model may identify and/or indicate to the navigation system a route within a worksite of the machine 100, a waypoint associated with the route of the machine 100, or an obstruction within or along the route of the machine 100.

In some implementations, the LIDAR analysis model is configured to identify a designated object (e.g., a particular object of interest) associated with an environment of the machine 100 (e.g., particular types of obstructions, waypoints of a route, and/or the like). For example, the LIDAR analysis model may correspond to an object detection model that is trained to identify obstructions within a navigable environment and/or determine the type of the obstruction (e.g., based on a size and/or shape of the obstruction 204) using reference information and/or data associated with a set of reference obstructions. The object detection model may be configured to identify a particular object of interest at a particular distance when a threshold quantity of LIDAR points of the scan area illuminate the particular object of interest. The increased point density of the scan area, as described herein, may correspondingly enable the threshold quantity of LIDAR points to be satisfied, to permit the LIDAR controller 430 to detect and/or identify the particular object of interest.

The output device manager 480 includes one or more components or devices configured to perform an action associated with the machine 100 and/or the environment of the machine 100. The output device manager 480 may provide information associated with a characteristic of the environment of the machine 100 which may be based on or correspond to whether the environment includes an object of interest. For example, the output device manager 480 may indicate, via the operator interface 112 (e.g., via a display), whether the environment includes an object of interest, provide, based on whether the environment includes the object of interest, navigation instructions associated with the environment to permit the machine 100 to navigate according to the object of interest, and/or the like. The output device manager 480 may provide an alert to an operator when an obstruction is detected within a route path of the machine 100 (e.g., to enable the operator to avoid the obstruction). In some implementations, the output device manager 480 may autonomously control the machine 100 according to whether an object of interest is within the environment.

The number and arrangement of modules and/or devices shown in FIG. 4 are provided as an example. In practice, there may be additional modules and/or devices, fewer modules and/or devices, different modules and/or devices, or differently arranged modules and/or devices than those shown in FIG. 4. Furthermore, two or more modules and/or devices shown in FIG. 4 may be implemented within a single module or device, or a single module or device shown in FIG. 4 may be implemented as multiple, distributed modules or devices. A set of modules or devices (e.g., one or more modules or devices) of system 400 may perform one or more functions described as being performed by another set of modules or devices of system 400.

Figure 5:
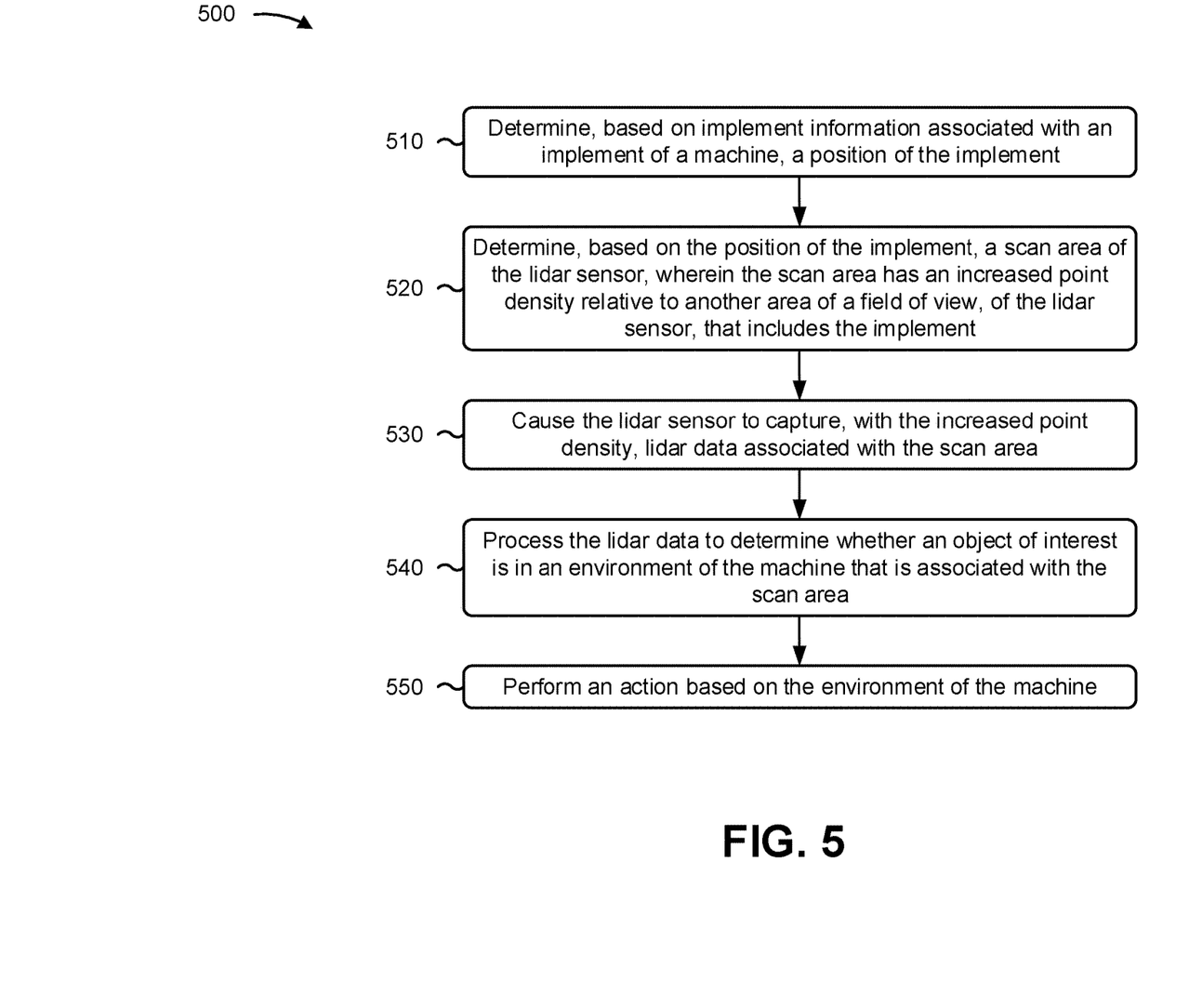
FIG. 5 is a flowchart of an example process associated with configuring of a LIDAR sensor scan area to mask an implement of a machine, as described herein.

FIG. 5 is a flowchart of an example process 500 for title. In some implementations, one or more process blocks of FIG. 5 may be performed by a LIDAR controller (e.g., LIDAR controller 430). In some implementations, one or more process blocks of FIG. 5 may be performed by another device or a group of devices separate from or including the LIDAR controller, such as a LIDAR sensor (e.g., LIDAR sensor 410), an ECM (e.g., ECM 114), implement information sources (e.g., implement information sources 420), and/or the like.

As shown in FIG. 5, process 500 may include determining, based on implement information associated with an implement of a machine, a position of the implement (block 510). For example, the LIDAR controller (e.g., using implement position analyzer 440) may determine, based on implement information associated with an implement of a machine, a position of the implement, as described above.

The implement information may include an operator input that identifies a setting associated with the position of the implement or a sensor measurement that identifies the position of the implement. The implement information may identify a set position of a plurality of positions of the implement, and the scan area is determined based on a point mapping that identifies coordinates of the scan area for the set position, where the coordinates are based on the field of view of the LIDAR sensor.

As further shown in FIG. 5, process 500 may include determining, based on the position of the implement, a scan area of the LIDAR sensor, wherein the scan area has an increased point density relative to another area of a field of view, of the LIDAR sensor, that includes the implement (block 520). For example, the LIDAR controller (e.g., using scan area selection module 450) may determine, based on the position of the implement, a scan area of the LIDAR sensor, as described above. In some implementations, the scan area has an increased point density relative to another area of a field of view, of the LIDAR sensor, that includes the implement.

As further shown in FIG. 5, process 500 may include causing the LIDAR sensor to capture, with the increased point density, LIDAR data associated with the scan area (block 530). For example, the LIDAR controller (e.g., using LIDAR central controller 460) may cause the LIDAR sensor to capture, with the increased point density, LIDAR data associated with the scan area, as described above.

As further shown in FIG. 5, process 500 may include processing the LIDAR data to determine whether an object of interest is in an environment of the machine that is associated with the scan area (block 540). For example, the LIDAR controller (e.g., using LIDAR data processor 470) may process the LIDAR data to determine whether an object of interest is in an environment of the machine that is associated with the scan area, as described above. Process 500 may include identifying the object of interest in the environment, and analyzing the object of interest to determine a status of an operation associated with the machine.

As further shown in FIG. 5, process 500 may include performing an action based on the environment of the machine (block 550). For example, the LIDAR controller (e.g., using output device manager 480) may perform an action based on the environment of the machine, as described above.

Process 500 may include indicating, via an operator interface of the machine, whether the environment includes the object of interest, or providing, based on whether the environment includes the object of interest, navigation information to permit the machine to be controlled through the environment. Process 500 may include providing information associated with the status of the operation.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

An implement of a machine may be controlled to be in a variety of different positions according to certain operations of the machine. Certain positions of the implement may cause the implement to be within a field of view of a light detection and ranging (LIDAR) sensor on the machine. For example, during a transport or travel operation of the machine 100 (e.g., associated with the position of the implement 108 in example implementation 200), the implement 108 may be within the field of view 124 of the LIDAR sensor 122, as described herein. On the other hand, during a dig operation, the implement 108 may not be within the field of view 124 of the LIDAR sensor 122.

According to some implementations described herein, the LIDAR controller 430 and/or the ECM 114 may configure a scan area of the LIDAR sensor 122 based on a position of the implement 108. The scan area may be configured to mask the implement 108 when the implement 108 is within the field of view 124 to increase processing speeds associated with a scan of the LIDAR sensor 122 and/or to improve a point density of the scan area. Accordingly, the increased processing speeds and/or increased point density may improve an accuracy associated with the LIDAR sensor 122 (and/or the ECM 114) detecting and/or analyzing a characteristic of an environment of the machine 100 (e.g., by increasing a number of possible scans of an object of interest, by increasing a number of LIDAR points that may illuminate an object of interest, and/or the like). Furthermore, the LIDAR controller 430, as described herein, may conserve resources (e.g., processing resources, memory resources, and/or the like) associated with the LIDAR sensor 122 continuously capturing and providing LIDAR data that is associated with the implement 108 when the implement 108 is within the field of view, which is not conducive to detecting objects of interest within an environment beyond or adjacent the implement 108 (e.g., because the implement 108 blocks a view of the environment).

Furthermore, the LIDAR controller 430 may control the LIDAR sensor 122 to increase a point density of a scan area of an object of interest according to the position of the implement 108. In this way, the LIDAR controller 430 increases a probability that more LIDAR data associated with an object of interest can be obtained in order to identify the object of interest. Therefore, the LIDAR controller 430 improves a level of accuracy associated with determining a characteristic of an environment of the machine 100. Correspondingly, the LIDAR controller 430 may permit more accurate and quicker detection of an object of interest in the environment of the machine 100. For example, the LIDAR controller 430, as described herein, provides more accurate and relatively faster detection of the obstruction 204 of FIG. 2, thus preventing possible damage to the implement 108 and/or machine 100 resulting from a collision with the obstruction 204.

As described herein, a LIDAR sensor may be mounted in a fixed location of the machine and, correspondingly, may have a fixed field of view. Therefore, relative to techniques that involve a LIDAR sensor mounted to an independently controlled mechanical device configured to adjust the field of view, the examples described herein permit relatively simplistic mounting and control of the LIDAR sensor, thus reducing hardware resources, cost, and design complexity (e.g., by eliminating a need to develop controls for the mechanical device to operate in association with the LIDAR sensor), and/or computing resources (e.g., processing resources and/or memory resources associated with adjusting position of the mechanical devices).

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
 causing, by a device, a light detection and ranging (LIDAR) sensor to capture LIDAR data with a first point density within a first scan area;
 receiving, by the device, implement information associated with an implement of a machine, at least a portion of the implement being located within the first scan area such that points from the LIDAR sensor are directed on the implement;
 determining, by the device and based on the implement information, a position of the implement relative to a field of view of the LIDAR sensor;
 determining, by the device and based on the position of the implement, a second point density within a second scan area, the second point density being different than the first point density and having an increased point density relative to another area of the field of view that includes the implement, the second point density including points that are redistributed from the implement to locations spaced away from the implement and spaced away from a detected object;
 causing, by the device, the LIDAR sensor to capture, with the second point density, LIDAR data associated with the second scan area; and
 processing, by the device, the LIDAR data to determine, using an object detection model, a characteristic of an environment associated with the second scan area; and
 performing, by the device, an action associated with the characteristic.

2. The method of claim 1, wherein the implement information is received from at least one of:
 an operator interface of the machine that enables operator control of the implement and includes a setting of the implement within the implement information, or
 a position sensor that senses the position of the implement and includes a measurement associated with the sensed position of the implement within the implement information.

3. The method of claim 1, wherein the LIDAR sensor is mounted to the machine in a fixed position that enables, based on the position, at least the portion of the implement of the machine to be within the field of view.

4. The method of claim 1, wherein determining the second point density within the second scan area comprises:
  determining the position of the implement relative to the field of view of the LIDAR sensor;
  determining a perimeter of a mask area associated with portions of the implement that are within the field of view,
    wherein second the scan area corresponds to an area of the field of view that does not include the mask area; and
  distributing a total quantity of LIDAR points of the LIDAR sensor throughout the second scan area to provide the second point density.

5. The method of claim 1, wherein causing the LIDAR sensor to capture the LIDAR data comprises:
  configuring the LIDAR sensor to focus a fixed quantity of LIDAR points of a scan of the LIDAR sensor to be focused within a perimeter of the second scan area; and
  causing the LIDAR sensor to execute the scan to capture the LIDAR data.

6. The method of claim 1, wherein the object detection model is trained to identify an obstruction within the environment,
  wherein the characteristic of the environment corresponds to whether one or more obstructions are within the environment.

7. The method of claim 1, wherein the characteristic is associated with whether the environment includes the detected object, the detected object being an object of interest, and
  wherein performing the action comprises:
    indicating, via an operator interface of the machine, whether the environment includes the object of interest, or
    providing, based on whether the environment includes the object of interest, navigation instructions associated with the environment to permit the machine to navigate according to the characteristic.

8. A device, comprising:
one or more memories; and
one or more processors, communicatively coupled to the one or more memories, configured to:
  cause a light detection and ranging (LIDAR) sensor mounted to a machine to capture LIDAR data associated with a scan area;
  determine a position of an implement of the machine;
  cause, based on the position of the implement, the LIDAR sensor to capture LIDAR data in the scan area;
  determine a change in the position of the implement of the machine;
  determine, based on the changed position of the implement of the machine, a changed scan area within a field of view of the LIDAR sensor,
    wherein the changed scan area has an increased point density relative to another area of the field of view that includes the implement;
  cause the LIDAR sensor to capture, with the increased point density, LIDAR data associated with the changed scan area;
  process the LIDAR data to determine whether an object of interest is within the changed scan area; and
  perform an action associated with whether the object of interest is within the changed scan area.

9. The device of claim 8, wherein the one or more processors are further configured to:
  receive, from an operator interface, implement information identifying the position of the implement of the machine and the changed position of the implement of the machine,
    wherein the one or more processors, when determining the position and the changed position, are configured to:
      determine the position based on the implement information.

10. The device of claim 8, wherein the scan area is determined based on a point mapping in a data structure that maps a plurality of positions of the implement to corresponding scan areas.

11. The device of claim 8, wherein the one or more processors, when determining the scan area, are configured to:
  determine the position of the implement relative to the field of view of the LIDAR sensor;
  determine a perimeter of a mask area associated with portions of the implement that are within the field of view; and
  redistribute LIDAR points of the LIDAR sensor from the mask area to the scan area to provide the increased point density.

12. The device of claim 8, wherein the LIDAR data is processed using an object detection model,
  wherein the object detection model is configured to identify a particular object of interest at a particular distance when a threshold quantity of LIDAR points of the scan area illuminate the particular object of interest,
    wherein the increased point density enables the threshold quantity of LIDAR points to be satisfied.

13. The device of claim 8, wherein the LIDAR data is processed using an object detection model,
  wherein the object detection model is associated with a navigation system of the machine, and
    wherein the object detection model is configured to identify and indicate to the navigation system at least one of:
      a route within a worksite of the machine,
      a waypoint associated with the route of the machine, or
      an obstruction associated with the route of the machine.

14. The device of claim 8, wherein performing the action comprises at least one of:
  indicating, via a display of an operator interface, whether the object of interest is within an environment of the machine that is associated with the scan area, or
  controlling the machine according to whether the object of interest is within the environment.

15. A system comprising:
a light detection and ranging (LIDAR) sensor; and
a controller configured to:
  determine, based on implement information associated with an implement of a machine, a position of the implement;
  determine, based on the position of the implement, a scan area of the LIDAR sensor,
    wherein the scan area has an increased point density relative to another area of a field of view, of the LIDAR sensor, that includes the implement caused by refocusing points that previously illuminated and/or reflected portions of the implement located within a mask area to areas associated with an object of interest and to areas associated with a navigable environment of the machine that is associated with a route;

cause the LIDAR sensor to capture, with the increased point density, LIDAR data associated with the scan area;

process the LIDAR data to determine whether the object of interest is in the environment of the machine that is associated with the scan area; and perform an action based on the environment of the machine.

16. The system of claim 15, wherein the implement information comprises at least one of:

an operator input that identifies a setting associated with the position of the implement, or a sensor measurement that identifies the position of the implement.

17. The system of claim 15, wherein the implement information identifies a set position of a plurality of positions of the implement, and wherein the scan area is determined based on a point mapping that identifies coordinates of the scan area for the set position, wherein the coordinates are based on the field of view of the LIDAR sensor.

18. The system of claim 15, wherein the implement information includes at least one of:

an operator input associated with a setting for the position of the implement, or a sensor measurement that indicates the position of the implement.

19. The system of claim 15, wherein the controller, when processing the LIDAR data, is configured to:

identify the object of interest in the environment; and analyze the object of interest to determine a status of an operation associated with the machine, wherein the controller, when performing the action, is configured to:

provide information associated with the status of the operation.

20. The system of claim 15, wherein the controller, when performing the action, is configured to:

indicate, via an operator interface of the machine, whether the environment includes the object of interest, or provide, based on whether the environment includes the object of interest, navigation information to permit the machine to be controlled through the environment.

* * * * *